United States Patent [19]
Lambert

[11] 3,895,531
[45] July 22, 1975

[54] APPARATUS FOR SENSING VOLUMETRIC RATE OF AIR FLOW

[76] Inventor: Robert R. Lambert, 442 W. Leadora Ave., Glendora, Calif. 91740

[22] Filed: Mar. 17, 1969

[21] Appl. No.: 814,498

Related U.S. Application Data
[63] Continuation-in-part of Ser. No. 706,058, Feb. 16, 1968, abandoned.

[52] U.S. Cl................................... 73/212; 236/13
[51] Int. Cl. .............................................. G01f 1/00
[58] Field of Search......................... 73/212; 236/13

[56] References Cited
UNITED STATES PATENTS

| | | |
|---|---|---|
| 886,255 | 4/1908 | Sargent................................. 73/212 |
| 1,087,930 | 2/1914 | Dodge.............................. 73/212 X |
| 1,116,938 | 11/1914 | Sheldon .............................. 73/212 |
| 1,145,222 | 7/1915 | Wilkinson............................ 73/212 |
| 1,250,238 | 12/1917 | Spitzglass............................. 73/212 |
| 1,508,017 | 9/1924 | Greve .................................. 73/212 |
| 2,325,018 | 7/1943 | Moss.................................... 73/212 |
| 2,609,183 | 9/1952 | Fitzgerald ...................... 236/13 UX |
| 2,828,076 | 3/1958 | Donahue............................. 236/13 |
| 3,422,682 | 1/1969 | Evans et al. ..................... 73/212 X |

Primary Examiner—Richard C. Queisser
Assistant Examiner—John P. Beauchamp

[57] ABSTRACT

An apparatus for sensing volumetric rate of air flow for use in heating and cooling systems for measuring the ram or velocity air pressure over a substantial transverse area of a duct by sensing the total and static air pressure within the duct through hollow plenum-like members disposed within the duct, each of the members having openings, one of which has openings facing the general air flow direction and the other of which has openings perpendicular to the general direction of air flow.

6 Claims, 6 Drawing Figures

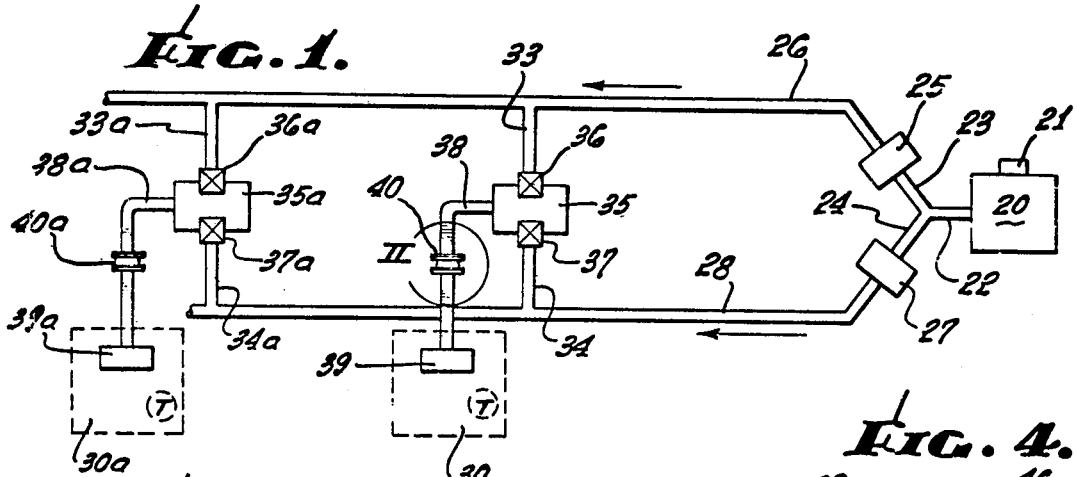
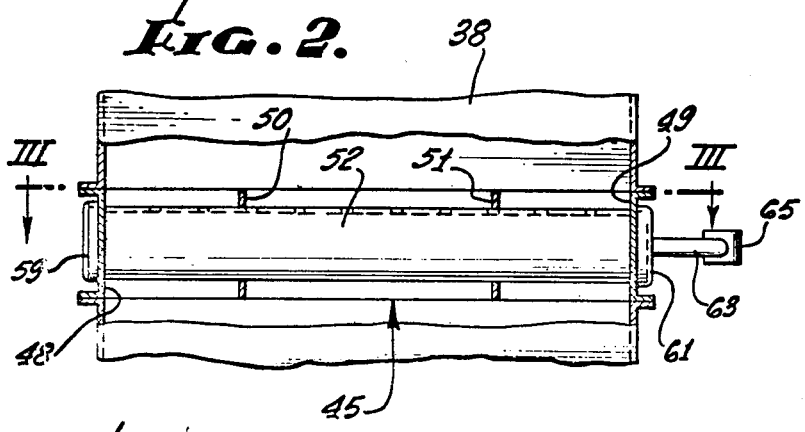
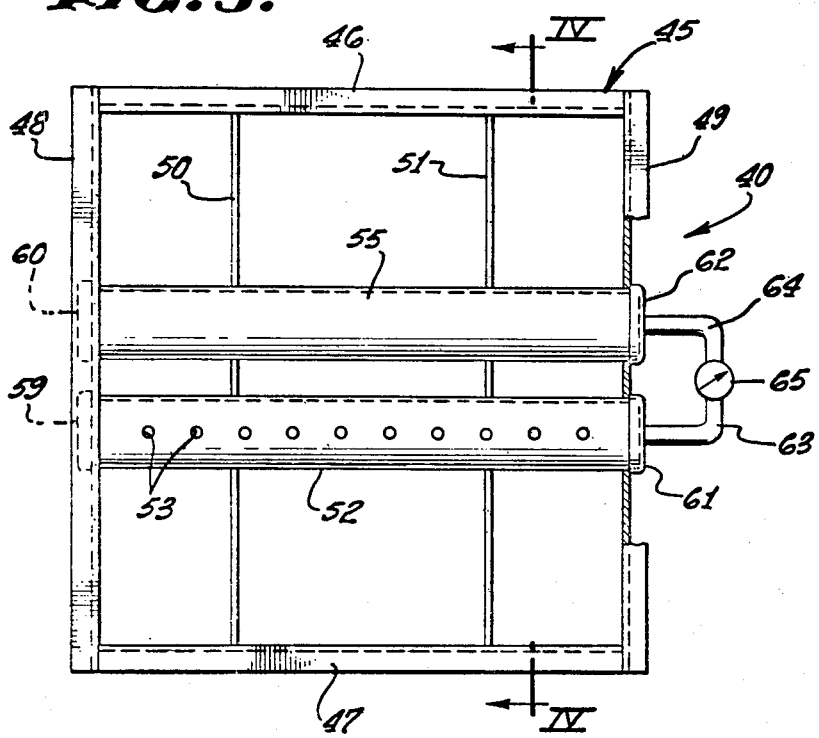

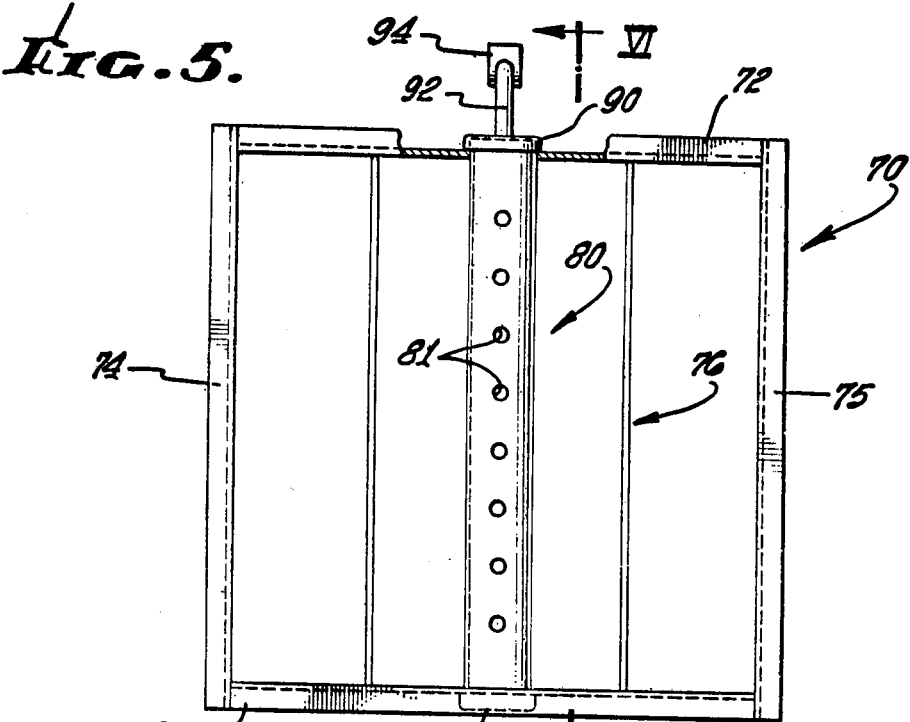
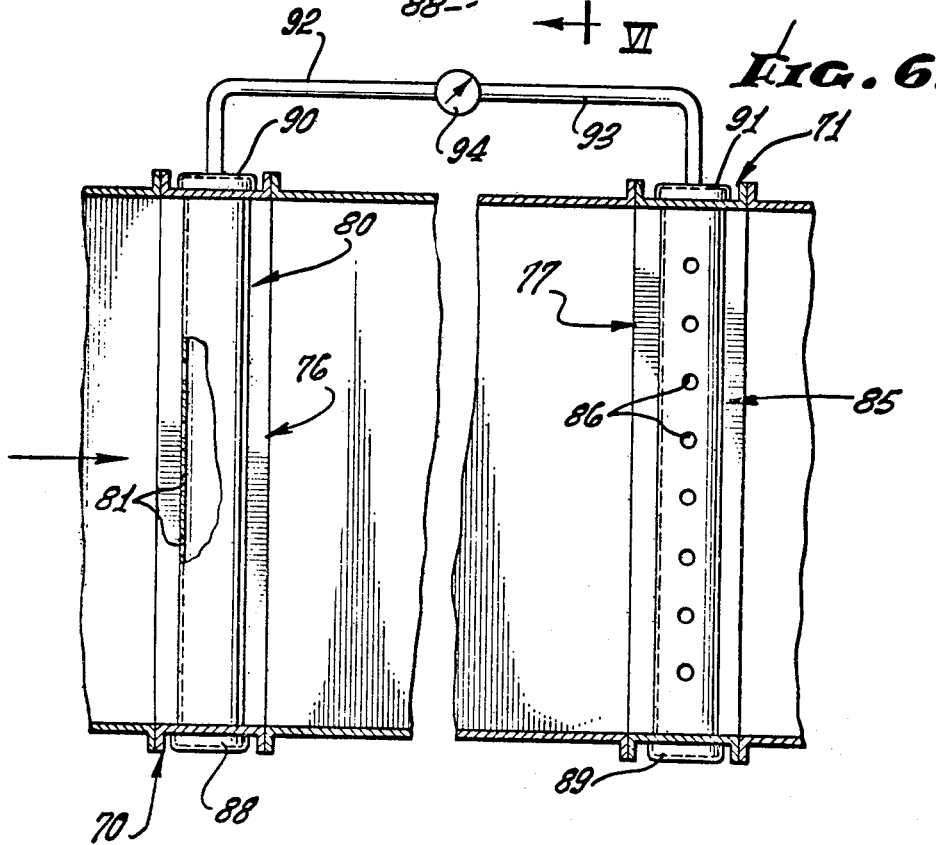

APPARATUS FOR SENSING VOLUMETRIC RATE OF AIR FLOW

This is a continuation-in-part of application Ser. No. 706,058, filed Feb. 16, 1968, now abandoned entitled Apparatus for Sensing Volumetric Rate of Air Flow.

BACKGROUND OF THE INVENTION

This invention relates to air flow sensing apparatus for use in heating and ventilating systems, and more particularly to such an apparatus for use in sensing variations in air flow in a low pressure system.

As background for the invention, it is observed that in the art of heating and ventilating systems, it is often required to measure the volumetric rate of air flow through a duct. For example, a system may comprise a source of hot air, and a source of ventilating or cool air with suitable flow control valves in each of the ducts. In attempting to provide a zone of desired temperature and constant volume transport of air to such zone, there is generally provided a temperature-electrical transducer, or thermostat, which is responsive to the air temperature in the zone for selectively opening and closing an air flow control valve positioned within the hot air duct. In this manner, the temperature of the air transported through the ducts to the zone may be controlled. However, it is also desirable to provide a constant volume flow of air through the ducts into the zone to be controlled. Consequently, when the thermostat is operative so as to reduce the volumetric rate of air flow into the zone, it is necessary to sense the decrease in the total volume of air flow transported to the zone and thereby actuate the air flow control valve in the cooling or ventilating duct so as to open such valve thereby maintaining a constant volume of air to the zone.

It will, of course, be understood, that while the present invention was conceived in relation to the above-described heating and ventilating system, there are various purposes and uses for volumetric rate of air flow sensing apparatus in heating and ventilating systems.

Prior art attempts to provide a volumetric rate of air flow sensing apparatus for heating and ventilating systems have not been entirely successful. One such type of apparatus includes a plurality of Pitot tubes spaced over a transverse area of the air duct. However, such devices have been afflicted with problems of turbulence within the duct air flow, with the requirement for a multiplicity of such devices to obtain a proper sampling of air flow pressures throughout the duct, and the requirement for means for summing the various pressures measured in the discrete regions of the area so as to provide an average air flow pressure within the entire duct. Moreover, where it is desired to transport air to a plurality of zones which are desired to be maintained at a particular temperature and each of which is desired to be provided with a constant air flow volume, volumetric rate of air flow sensing apparatus must be provided for each zone to be controlled, and in large buildings, the cost of the above-described prior art apparatus has been prohibitive.

The prior art also shows volumetric rate of air flow sensing apparatus comprising a bell-shaped device, or venturi tube positioned within the air flow duct. The obvious disadvantage of such prior art devices is the necessity for passing the entire volume of air flow through such apparatus. Furthermore, the constriction area of the venturi causes velocity changes which are generally undesirable. It will also be appreciated that such devices are generally large and cumbersome for installation and consequently expensive and thereby prohibitive for multiple use to control multiple zones.

Another type of prior art device is shown in U.S. Pat. No. 3,227,369 but such device is mechanical and complex increasing both the possibility of malfunctioning during prolonged use and attendant maintenance costs.

Accordingly, it is the general object of the present invention to provide a volumetric rate of air flow sensing apparatus that avoids all of the foregoing disadvantages of similar types of apparatus used heretofore.

It is an object of the present invention to provide a volumetric rate of air flow sensing apparatus for use in heating and ventilating systems for the accurate measurement of low velocity air that is simple in construction and operation and economical in manufacture and maintenance and therefore adapted for multi-zone use.

It is another object of the present invention to provide a volumetric rate of air flow sensing apparatus which is sensitive to small variations in the air flow velocity and which samples air pressures over a substantial transverse area of the air duct in which it is employed.

It is still another object of the present invention to provide a volumetric rate of air flow sensing apparatus which may be easily calibrated at the time of installation and is adapted for installation in pre-existing air duct systems with a minimum of constructional changes.

It is one more object of the present invention to provide a volumetric rate of air flow sensing apparatus which is relatively insensitive to air flow turbulence within the air duct, and measures the static pressure of the air flow after the air flow turbulence has been mitigated by passing the air flow through a linear nozzle.

It is yet another object of the present invention to provide a volumetric rate of air flow sensing apparatus wherein a pair of pressure sensing hollow tubular members are placed in line of the direction of air flow through the air duct, the forward hollow tubular member sensing total pressure, and the rearward hollow tubular member sensing static air flow pressure.

It is still one more object of the present invention to provide a volumetric rate of air flow sensing apparatus which requires a relatively short length of straight air duct prior to measuring the total and static pressure in a heating and ventilating air duct system including numerous bends and elbows.

Further objects and advantages will become apparent to one skilled in the art by consideration of the exemplary embodiment disclosed herein. Reference will now be made, for that purpose, to the appended drawing in which:

IN THE DRAWING

FIG. 1 is a schematic illustration of a heating and ventilating system employing an apparatus for sensing volumetric rate of air flow constructed in accordance with the present invention;

FIG. 2 is a detailed top sectional view of the apparatus shown in FIG. 1;

FIG. 3 is a side elevation partial sectional view of the apparatus shown in FIG. 2 taken along the line III—III;

FIG. 4 is an end sectional view of the apparatus shown in FIG. 3 taken along the plane IV—IV;

FIG. 5 is a side elevation sectional view of a second exemplary embodiment of an apparatus for sensing volumetric rate of air flow constructed in accordance with the present invention; and FIG. 6 is a sectional view of the apparatus taken along the plane VI—VI of FIG. 5.

Generally, the present invention relates to an apparatus for sensing volumetric rate of air flow to be used, for example, in a heating and ventilating or cooling system and which includes a static air flow pressure sensing member and a total air flow pressure sensing member, the static member comprising a hollow tubular member disposed transversely in a duct in the system and having a series of spaced openings facing perpendicular to the general direction of air flow, and in which the total air flow pressure sensing member comprises a hollow tubular plenum-like cylinder having a plurality of spaced openings facing the general air flow direction, each of the tubular members having one end thereof closed and the other end in fluid communication with means for measuring the differential between the total and static pressure so as to provide an indication of velocity pressure. Means may be provided responsive to changes in the velocity pressure for selectively controlling air flow control valves in one or more of the ducts of the heating and ventilating system.

Referring now to FIG. 1, there is shown a heating and cooling system including a fan 20, driven by a motor 21 to force air through a common duct 22 which is bifurcated to provide a first duct 23 and a second duct 24. First duct 23 transports air through a cooling coil 25 and into cool air duct 26. It will be understood that the present invention is useable in a system which employs a fresh air supply rather than air cooled by a coil such as 25. The air through second duct 24 passes through a heating coil 27 and into a hot air duct 28. The cool air duct 26 and hot air duct 28 are illustrated in a system in which the air is delivered to multiple control zones, two of which are indicated at 30 and 30a. Forced air is supplied to zone 30 through branch cool air and hot air ducts 33 and 34, respectively, into a mixing unit 35. The amount of air from each of the ducts 33, 34 is controlled by air flow control valves 36, 37, respectively. Mixing unit 35 discharges a controlled mixture of air into a zone supply duct 38 which terminates in a discharge unit 39 located in controlled zone 30.

The amount of air supplied to mixing unit 35 through branch hot air duct 34 is controlled by air flow control valve 37. Valve 37 is open and closed in response to a temperature-electrical transducer, or thermostat T, which is located in controlled zone 30. It will be obvious that in opening and closing valve 37 in response to changes in temperature in controlled zone 30, the volumetric rate of air flow discharging from mixing unit 35 will vary unless valve 36 in branch cool air duct 33 is complementarily controlled. To maintain a constant volumetric rate of air flow into controlled zone 30, therefore, there is provided a volumetric rate of air flow sensing apparatus 40 disposed within zone supply duct 38. The function of apparatus 40 will be easily understood by reference to a description of the operation of the system.

Assume that a given volume of air is being transported to control zone 30. The transported air may comprise any mixture of hot and cold air as determined by the selection of valves 36 and 37. In the event that the air temperature in controlled zone 30 becomes, for example, higher than desired, thermostat T will be actuated so as to partially close hot air control valve 37. Accordingly, the volumetric rate of air flow into mixing unit 35 and discharging into zone control duct 38 will be decreased. To maintain a constant volumetric rate of air flow into control zone 30, apparatus 40 will sense the decreased volumetric rate of air flow through zone supply duct 38.

Apparatus 40 is suitably connected to cold air flow control valve 36, through means to be described more fully hereinafter, and will be actuated by the decreased volumetric rate of air flow through duct 38 so as to open valve 36 increasing the volumetric rate of air flow from discharge unit 35 and thereby maintaining a constant volumetric rate of air flow into control zone 30.

It will be understood that the ducts, valves, and temperature and volumetric rate of air flow sensing apparatus as described in relation to control zone 30 will be the same for control 30a and accordingly like elements are identified with like reference numerals including the letter "a". It will be understood that each of the control zones may be an individual room in a home or commercial or industrial building. Such control zones may also indicate a given volumetric portion of a large uncompartmented area, such as in a factory. In any event, it is important to note that for each control zone, it is necessary to provide both valves and valve control apparatus for each control zone. Consequently, where a multiplicity of control zones exists, the complexity and costs of each of these elements is an important desideratum in the design and construction of the elements.

With particular attention to apparatus 40 for sensing volumetric rate of air flow, it should be understood that in a heating and ventilating or cooling system of the abovedescribed type, the volumetric rate of air flow is relatively small. For example, the air flow velocity in the ducts of this type of system is on the order of 600 to 1400 feet per minute. Moreover, the static duct pressure within such a system is generally less than one-half inch of water. Since the duct pressure remains relatively constant, the volumetric rate of air flow may be sensed by an apparatus which can accurately sense the change in velocity of the air through the duct. However, in this regard, there are several problems. One of these is the relatively minute change in velocity or ram pressure which is produced by even a substantial change in the air flow velocity. For example, a change of 200 feet per minute in velocity of air through the duct will result in only a 0.03 inch change in water pressure. Thus, it will be seen that the sensitivity of the volumetric rate of air flow apparatus must be considerable. Another problem of significant proportions is the turbulence within the heating and ventilating duct system. From the above indications of the necessary sensitivity of the apparatus, it will be apparent that turbulence within the duct must be reduced as far as possible prior to measuring the velocity or ram air flow pressure.

Referring now to FIGS. 2 through 4, the apparatus 40 for sensing the volumetric rate of air flow in duct 38 is shown in detail. Apparatus 40, in the first exemplary embodiment of FIGS. 2 through 4, comprises a frame indicated at 45 including a top member 46, bottom member 47, and side members 48, 49. Each of the members comprising the frame are provided with flanges or lips along the longitudinal edges thereof adapted for abutting connection to flanges or lips on duct 38.

Apparatus 40 is provided with a pair of vertical air vanes or straighteners 50, 51 which are horizontally spaced apart.

Means for measuring the total air pressure is provided in apparatus 40 and comprises a hollow tubular member 52 horizontally supported in the transverse plane by frame 45. Side members 48 and 49 are provided with openings for receiving tubular member 52. Tubular member 52 constitutes a plenumlike chamber, having a series of axially spaced in-line openings 53 disposed through the outer wall of the tubular member 52. The openings 53 when the tubular member 52 is in the frame 45 will face the general direction of air flow through the frame, that is, the axis of the openings 53 will all be in a plane parallel to the center line of the frame 45 and the duct 38 in which the frame 45 is mounted.

Apparatus 40 also includes means for sensing the static air flow pressure within the duct comprising a hollow tubular member 55 transversely supported in a horizontal position by frame 45 through openings in side members 48, 49 and in vanes 50. 51. Tubular member 55 has a series of axially spaced in-line openings 56 disposed through the outer wall of the tubular member 55. The openings 56 when the tubular member 55 is in the frame 45, will face normal to the general direction of air flow, preferably towards the tubular member 52. In other words, the axes of the openings 56 will lie in a plane normal to the center line of the frame 45 and the duct 48 in which the frame 45 is mounted. Tubular members 52 and 55 are identical, differing only in their orientation with respect to the air flow.

As seen best in FIG. cross-section, the area between tubular members 52, 55 defines, in cross-sectiona, a converging nozzle. This "linear nozzle" is used advantageously in the present device by providing the openings 56 in the tubular member 55 at a point within the nozzle so that measurement of the static air pressure will be relatively unaffected by turbulence within the duct. Moreover, it will be seen that the vanes 50, 51 also aid in preventing turbulent flow within the area of the duct in which the static and total air pressures are measured. It has been found that the linear nozzle performs most efficiently by laterally spacing apart the tubular members 52, 55 a distance equal to one half the diameter of each of the tubular members.

Apparatus 40 is constructed so as to provide an effective measurement of the average pressure over the crosssectional area of the duct. This provision resides in the relationship between the total area of the openings in the tubular members to the volume of air enclosed in each of such members. The total area of the plurality of openings, each of relatively small cross-sectional area, is such that the internal volume of air within each of the tubular members forms a plenum. Variations in the air flow pressure as sensed by each of the openings in the tubular members are thereby averaged within the tubular members. Moreover, if considerable pressure differential exists across the transverse area of the duct, the relatively large air volume will within each tubular member preclude air flow out of the tubular member openings in the lower pressure transverse area which would adversely affect true pressure measurement.

Apparatus 40 may include means for measuring the differential pressure between the total and static pressure as measured by the tubular members. Two of the adjacent ends of the tubular members are closed by end caps 59, 60. The opposite adjacent ends of tubular members 52, 55 are provided with caps 61, 62, respectively, each of which have a central opening for receiving pipes 63, 64 connected to, for example, a pressure gage 65. As is well known in the art, this differential pressure is equal to the velocity or ram air flow pressure within the duct. When apparatus 40 is installed in a heating and cooling or ventilating system, such as described with reference to FIG. 1, pipes 63, 64 are connected to a pressure-electrical transducer or relay which senses changes in the velocity pressure of the air flow and provides current to an electric motor (not shown) for operating flow control valve 36. During installation of a heating and ventilating system, or during maintenance of such system, the pipes 63 and 64 may be connected to the pressure gage 65 for visually sensing the differential pressure enabling a workman to ascertain if the system is functioning properly.

It will be apparent to those skilled in the art that the positioning of the tubular members 52 and 55 so as to form a linear nozzle will affect the static pressure as measured through the openings 56 in tubular member 55. Air passing through the converging nozzle is accelerated so that the static pressure in such air stream is reduced and therefore the static air pressure as measured will differ slightly from the static air pressure within the air flow throughout the duct. However, it has been found that the relationship between the change in static pressure due to the passing of the air through the nozzle is linearly related and appropriate compensation can be made in the pressure-electrical transducer or pressure gage used to measure the ram or velocity pressure of the air flow throughout the duct. It has been found that pressure sensitive electrical relays responsive to a pressure change of 0.02 inches of water are commercially available and may be effectively used in conjunction with apparatus 40 in a heating and ventilating system.

It should be understood that apparatus 40, by providing means for reducing the turbulence in the crosssectional area of the duct at which the air flow velocity pressure is measured, is useable in a duct immediately adjacent a bend or elbow of the duct. In prior art devices, measurement of the rate of volumetric air flow has been confined to the location of such devices in a relatively straight portion of the duct system. With the present device, however, it has been found that location of the device up to a minimum of one diameter of the duct downstream of an elbow or bend is sufficient for accurate measurement of the air flow velocity pressure.

It should also be understood that while the present invention has been described as comprising the tubular air flow pressure sensing members supported by a separate frame which may be inserted between adjoining duct sections, the invention additionally contemplates the installation of the tubular members, and vanes, within the duct itself. In such installation, the side walls of the duct are suitably modified with openings so as to support the tubular members 52, 55 and the vanes may be suitably secured to the top and bottom walls of the duct.

While the apparatus 40 has been described in connection with a heating and ventilating system for controlling a motor on a flow control valve, it will be apparent to those having skill in the art that the apparatus will also be useable for other purposes requiring an accurate measurement of the velocity pressure of the air flow within a duct. It may also be noted that the static pressure sensing member 55 may be provided with an additional series of axially spaced in-line openings disposed along a line located diametrically opposite to the line of which the first-described opening are disposed.

With reference now to FIGS. 5 and 6, a second exemplary embodiment of means for measuring the total air pressure is shown. Such apparatus generally comprises a pair of frames 70, 71 each of which include identical top, bottom and side members. For example, referring to FIG. 5, frame 70 includes top member 72, bottom member 73, and side members 74, 75. The apparatus may be provided with pairs 76, 77 of vanes or straighteners which are horizontally spaced apart and vertically mounted in frame 70, 71, respectively.

The means for measuring the total air pressure in the second embodiment of the apparatus comprises a hollow tubular member 80 vertically supported in the transverse plane by frame 70. Top and bottom members 72, 73 are provided with openings for receiving the upper and lower ends of the tubular member 80. Tubular member 80 constitutes a penumlike chamber, having a series of axially spaced in-line openings 81 disposed through the outer wall of the tubular member 80. The opening 81 when the tubular member 80 is in the frame 70 will face the general direction of the air flow through the frame 70, that is the axes of the openings 81 will all be in a plane parallel to or coincident with the center line of the frame 70 and the duct 38 in which the frame 70 is mounted. The means for sensing the static air flow pressure within the duct of the second exemplary embodiment of the invention also comprises a hollow tubular member 85 vertically supported in frame 71 through openings in the top and bottom members thereof. The tubular member 85 is downstream of the tubular member 80 to provide members 80 and 85 which are alligned in the general direction of air flow. In other words, the axes of the members 80 and 85 are in a plane parallel to or coincident with the center line of the frame 70 as opposed to being normal to the center line of the frame 45 as is the plane through the axes of the members 52 and 55 of the preferred embodiment. Tubular member 85 has a series of axially spaced in-line openings 86 disposed through the outer wall of the tubular member. The opening 86 when the tubular member 85 is in the frame 70 will face normal to the general direction of air flow. In other words, the axes of the openings 86 will lie in a plane normal to the center line of the frame 71 and the duct 48 in which the frame 71 is mounted. It will therefore be seen that tubular members 80, 85 are identical, differing only in their orientation with respect to the air flow.

As in apparatus 40, the second exemplary embodiment of the invention may include means for measuring the differential pressure between the total and static pressure measured by tubular members 80, 85. Two of the adjacent ends of the tubular members are closed by end caps 88, 89; the opposite adjacent ends of tubular members 80, 85 are provided with caps 90, 91, respectively, each of which have a central, opening for receiving pipes 92, 93 connected to, for example, a pressure gage 94.

It will now be seen that the second exemplary embodiment of the invention generally employs the same elements for measuring the volumetric rate of air flow through a duct. The second embodiment differs from the first embodiment in that the use of the linear nozzle to straighten air flow prior to the passage thereof past the static pressure sensing openings is not utilized. It has been found that, particularly in duct systems wherein air flow velocities are low and turbulence is minimal, the side-by-side relationship of the static and total air flow pressure sensing tubes is not critical.

In operation, the apparatus of the second exemplary embodiment operates in all respects identical to apparatus 40 although it will be noted that elimination of the linear nozzle will obviate the compensation required because of the acceleration of the air flow through the nozzle.

The embodiments disclosed herein of an apparatus for sensing volumetric rate of air flow are merely exemplary of the invention and the uses thereof and further modifications, alterations and adaptations of this invention as well as its uses, may come within the scope of the invention described and limited only by the following claims.

I claim:

1. An apparatus for sensing volumetric rate of air flow comprising:
   a total pressure sensing hollow tubular member having a series of axially spaced in-line openings facing the general direction of air flow,
   a static air flow pressure sensing hollow tubular member having at least one series of axially spaced in-line openings facing normal to the direction of air flow,
   means for supporting said total pressure sensing member and said static pressure sensing member in a plane transverse to the general direction of air flow and spaced from each other to form a nozzle therebetween, said openings in said static air flow pressure sensing hollow tubular member facing said total pressure sensing hollow tubular member to open towards said nozzle, and
   means for measuring differential pressure in fluid communication with the total and static pressure sensing members so as to provide an indication of the velocity pressure.

2. The apparatus for sensing volumetric rate of air flow as in claim 1 wherein the distance between said total and static pressure sensing members is approximately equal to one-half of the diameter of one of said total and static pressure sensing tubular members.

3. An apparatus for sensing the differential between an average total pressure and an average static pressure across a duct through which a fluid is flowing for use with a differential pressure responsive means, said apparatus comprising:
   a pair of hollow tubular members, each having a series of axially spaced in-line openings through a sidewall thereof, said members each having means for connecting them to said differential pressure responsive means; and
   means for mounting said members in spaced apart relation in a plane normal to the flow of fluid in said duct with the openings of one of said members facing into the flow of fluid for sensing total pressure across said duct and the openings of the other of said members facing normal to the flow of fluid and generally toward said one of said members to sense a reduced static pressure in said duct between said members produced due to an acceleration of fluid flow between said members due to their presence in said duct to thereby produce an increased differential pressure.

4. An apparatus for sensing average total and static pressures across a duct through which a fluid is flowing for a comparison thereof, said apparatus comprising:

a first hollow tubular means having a first series of axially spaced in-line openings through a sidewall thereof and means for mounting it across said duct with said openings facing into the flow of fluid therein for sensing an average of total fluid pressure across said duct;

a second hollow tubular means having a second series of axially spaced in-line openings through a sidewall thereof and means for mounting it across said duct in spaced relation to said first hollow tubular means for accelerating fluid flow therebetween with said second series of openings facing normal to said flow of fluid and toward said first tubular means.

5. A method of producing a pressure differential which is greater than, but linearly related to, the actual differential between the average total fluid pressure and the average static pressure across a duct in which a fluid is flowing comprising the steps of:

sensing an average of total pressure across said duct in a first transverse portion thereof;

accelerating the flow of fluid in at least one other transverse portion of said duct;

sensing an average of static pressure of fluid flow in said other transverse portion of said duct; and comparing said average pressures to obtain a pressure differential which is different from, but linearly related to, the actual velocity pressure of said fluid flowing in said duct.

6. The method of producing a pressure differential as in claim 5 wherein:

said step of sensing an average of total pressure across a first transverse portion of said duct includes the step of locating a hollow tubular member with a plurality of axially spaced in-line openings therein, across said duct, with the openings facing into the flow of fluid into said duct;

said step of accelerating the flow of fluid in at least one other transverse portion of said duct includes the step of placing a second hollow tubular member having a plurality of axially spaced in-line openings, in said duct in spaced relation to said first member to place said members in a plane transverse to the flow of fluid in said duct with the flow of fluid between said members being accelerated due to the presence of said members; and said step of sensing an average of static pressure includes the step of locating the axially spaced in-line opening in said second hollow tubular member to face toward said first tubular member and the fluid flowing between said members.

* * * * *